US011401389B2

(12) United States Patent
Demko

(10) Patent No.: US 11,401,389 B2
(45) Date of Patent: Aug. 2, 2022

(54) TRANSPARENT FLUOROPOLYMER FILMS

(71) Applicant: E I DU PONT DE NEMOURS AND COMPANY, Wilmington, DE (US)

(72) Inventor: Michael T Demko, Bear, DE (US)

(73) Assignee: E. I. DU PONT DE NEMOURS AND COMPANY, Wilmington, DE (US)

( * ) Notice: Subject to any disclaimer, the term of this patent is extended or adjusted under 35 U.S.C. 154(b) by 589 days.

(21) Appl. No.: 16/407,800

(22) Filed: May 9, 2019

(65) Prior Publication Data
US 2019/0359783 A1 Nov. 28, 2019

Related U.S. Application Data

(60) Provisional application No. 62/675,924, filed on May 24, 2018.

(51) Int. Cl.
| | | |
|---|---|---|
| *C08J 5/18* | (2006.01) | |
| *C08L 27/14* | (2006.01) | |
| *C08L 33/12* | (2006.01) | |
| *C08K 5/3492* | (2006.01) | |
| *C08K 5/00* | (2006.01) | |
| *C08K 5/3435* | (2006.01) | |
| *B32B 7/10* | (2006.01) | |
| *B32B 27/30* | (2006.01) | |

(52) U.S. Cl.
CPC ............... *C08J 5/18* (2013.01); *B32B 7/10* (2013.01); *B32B 27/308* (2013.01); *C08K 5/005* (2013.01); *C08K 5/3435* (2013.01); *C08K 5/3492* (2013.01); *C08L 27/14* (2013.01); *C08L 33/12* (2013.01); *B32B 2307/412* (2013.01); *B32B 2327/12* (2013.01); *B32B 2333/12* (2013.01); *B32B 2457/12* (2013.01); *C08J 2327/14* (2013.01); *C08J 2333/12* (2013.01)

(58) Field of Classification Search
CPC ...... C08J 5/18; C08J 2327/14; C08J 2333/12; C08L 27/14; C08L 33/12; C08K 5/3492; C08K 5/005; C08K 5/3435; B32B 2457/12; B32B 7/10; B32B 2307/412; B32B 2327/12; B32B 2333/12; B32B 27/308

USPC .......................................................... 428/421
See application file for complete search history.

(56) References Cited

U.S. PATENT DOCUMENTS

| | | | |
|---|---|---|---|
| 2,419,008 | A | 4/1947 | Coffman et al. |
| 2,510,783 | A | 6/1950 | Lewis et al. |
| 2,599,300 | A | 6/1952 | Upson |
| 3,278,663 | A | 10/1966 | Graham |
| 3,337,665 | A | 8/1967 | Underwood et al. |
| 3,456,044 | A | 7/1969 | Pahlke |
| 4,590,106 | A | 5/1986 | Hsu et al. |
| 4,760,116 | A | 7/1988 | Roberts |
| 4,769,421 | A | 9/1988 | Hwo |
| 4,797,235 | A | 1/1989 | Garland et al. |
| 4,886,634 | A | 12/1989 | Strutzel et al. |
| 5,256,472 | A * | 10/1993 | Moriya .................. B32B 27/30 428/215 |
| 5,725,935 | A * | 3/1998 | Rajan .................... G03G 13/16 428/195.1 |
| 6,420,033 | B1 | 7/2002 | Numrich et al. |
| 2008/0311406 | A1 | 12/2008 | Bonnet et al. |
| 2011/0297228 | A1 | 12/2011 | Li et al. |
| 2013/0136910 | A1 | 5/2013 | Numrich et al. |
| 2015/0299498 | A1* | 10/2015 | Schwartz ............ C09D 127/14 428/336 |
| 2016/0271912 | A1* | 9/2016 | Bizet ...................... B32B 27/36 |
| 2017/0145183 | A1 | 5/2017 | Hebrink |

FOREIGN PATENT DOCUMENTS

WO     2015/170030 A1    11/2015

* cited by examiner

*Primary Examiner* — Hui H Chin

(57) ABSTRACT

In a first aspect, a transparent fluoropolymer film includes, a vinyl fluoride polymer, 2 to 8 wt % of an acrylate polymer, and 0.1 to 4 wt % of a triazine UV absorber. After heating at 100° C. for 96 hours, the transparent fluoropolymer film has a 340 nm absorbance of at least 1.5. In a second aspect, a transparent multilayer film includes a polymeric substrate film and a fluoropolymer film. The fluoropolymer film includes a vinyl fluoride polymer, 2 to 8 wt % of an acrylate polymer and 0.1 to 4 wt % of a triazine UV absorber. After heating at 100° C. for 96 hours, the transparent fluoropolymer film has a 340 nm absorbance of at least 1.5.

21 Claims, No Drawings

TRANSPARENT FLUOROPOLYMER FILMS

BACKGROUND INFORMATION

Field of the Disclosure

This disclosure relates to transparent fluoropolymer films.

Description of the Related Art

Transparent polymeric films are widely used in outdoor applications for both rigid and flexible structures, such as building structures (e.g., greenhouses, roofing, siding, awnings, windows, etc.), signage, wall coverings, etc., as well as indoor applications where they may be exposed to sunlight. These transparent polymeric films require appropriate physical properties, weatherability and optical properties depending on their intended use. In some cases, a multilayer film may be used, in which each layer contributes some of the required film properties. A wide range of materials are used for transparent polymeric films in outdoor applications, including polyolefins, polyesters, polyacrylates, polyethylenes, polyethylene/ethylene vinyl acetate composites, and acrylic/polycarbonate composites. In some applications, transparent fluoropolymer-based films are used, such as polyvinyl fluoride, polyvinylidene fluoride and ethylene tetrafluoroethylene.

However, the variability of environmental conditions encountered in outdoor applications can prove quite challenging for many polymeric materials. Exposure to sunlight (especially ultraviolet radiation), oxygen, moisture, variable temperatures and other conditions can degrade polymeric materials, affecting their physical and optical properties, as well as their barrier properties. For example, transparent polyolefin films used in greenhouse applications may undergo photo-degradation when exposed to ultraviolet (UV) radiation. Furthermore, exposure to agricultural chemicals in these applications (e.g., herbicides, fungicides, insecticides, etc.) can also degrade polymeric materials.

Fluoropolymer films are useful for outdoor applications such as in photovoltaic (PV) modules, in which film composites of fluoropolymer film and polyester film, which act as a backing sheet for the module, are commonly used. Such composites have traditionally been produced from pre-formed films of fluoropolymer, such as polyvinyl fluoride (PVF) adhered to polyester film (e.g., polyethylene terephthalate, PET), often in the form of a laminate with a layer of PET film sandwiched between two PVF films, with an adhesive between the PVF and PET layers. These PV backsheets typically have pigments in them that make them opaque and protect against UV degradation of the film over multiple decades of continuous outdoor use. More recently, bifacial PV modules, where incident light can be captured on both the front and back sides of the module, have been developed. These bifacial modules can generate greater power output compared to a similarly designed conventional module with an opaque backsheet. Using a double glass structure on a bifacial module, having both a glass frontsheet and backsheet, however, can result in a higher operating temperature, a higher module weight, and a higher module breakage rate. Thus, alternatives to glass are desired.

SUMMARY

In a first aspect, a transparent fluoropolymer film includes, a vinyl fluoride polymer, 2 to 8 wt % of an acrylate polymer, and 0.1 to 4 wt % of a triazine UV absorber. After heating at 100° C. for 96 hours, the transparent fluoropolymer film has a 340 nm absorbance of at least 1.5.

In a second aspect, a transparent multilayer film includes a polymeric substrate film and a fluoropolymer film. The fluoropolymer film includes a vinyl fluoride polymer, 2 to 8 wt % of an acrylate polymer and 0.1 to 4 wt % of a triazine UV absorber. After heating at 100° C. for 96 hours, the transparent fluoropolymer film has a 340 nm absorbance of at least 1.5.

In a third aspect, an article includes a substrate and a transparent fluoropolymer film. The substrate includes a material selected from the group consisting of plastics, metals and woods. The transparent fluoropolymer film includes a vinyl fluoride polymer, 2 to 8 wt % of an acrylate polymer and 0.1 to 4 wt % of a triazine UV absorber. After heating at 100° C. for 96 hours, the transparent fluoropolymer film has a 340 nm absorbance of at least 1.5.

The foregoing general description and the following detailed description are exemplary and explanatory only and are not restrictive of the invention, as defined in the appended claims.

DETAILED DESCRIPTION

In a first aspect, a transparent fluoropolymer film includes, a vinyl fluoride polymer, 2 to 8 wt % of an acrylate polymer, and 0.1 to 4 wt % of a triazine UV absorber. After heating at 100° C. for 96 hours, the transparent fluoropolymer film has a 340 nm absorbance of at least 1.5.

In one embodiment of the first aspect, the transparent fluoropolymer film further includes a hindered amine light stabilizer. In a specific embodiment, the hindered amine light stabilizer includes bis(1,2,2,6,6-pentamethyl-4-piperidyl) sebacate, methyl 1,2,2,6,6-pentamethyl-4-piperidyl sebacate, bis(2,2,6,6-tetramethyl-4-piperidyl) sebacate, poly(4-hydroxy-2,2,6,6-tetramethyl-1-piperidine ethanol-alt-1,4-butanedioic acid), or a mixture thereof.

In another embodiment of the first aspect, the triazine UV absorber includes 2-hydroxyphenyl-s-triazine.

In still another embodiment of the first aspect, after soaking in methyl ethyl ketone solvent for 29 hours at room temperature, the transparent fluoropolymer film has a haze of less than 50%.

In yet another embodiment of the first aspect, after soaking in methyl ethyl ketone solvent for 29 hours at room temperature, the transparent fluoropolymer film has a transmission of at least 80%.

In still yet another embodiment of the first aspect, the acrylate polymer includes a methacrylate polymer. In a specific embodiment, the methacrylate polymer includes polymethyl methacrylate.

In a further embodiment of the first aspect, the acrylate polymer is a copolymer including a methacrylate monomer and one or more comonomers. In a specific embodiment, the one or more comonomers includes an ethyl acrylate, a butyl acrylate, a 2-ethylhexyl acrylate, an acrylic acid, a methacrylic acid or a mixture thereof.

In still a further embodiment of the first aspect, a ratio of acrylate polymer to triazine UV absorber is in a range of from about 2.5:1 to about 8:1. In a specific embodiment, the ratio of acrylate polymer to triazine UV absorber is about 4:1.

In yet a further embodiment of the first aspect, a ratio of UV absorber to a hindered amine light stabilizer is in a range of from about 1:1 to about 3:1. In a specific embodiment, the ratio of UV absorber to hindered amine light stabilizer is in a range of from about 1.5:1 to about 2:1.

In still yet a further embodiment of the first aspect, the fluoropolymer film has a thickness of from about 10 to about 200 µm. In a specific embodiment, the fluoropolymer film has a thickness of from about 20 to about 75 µm.

In a second aspect, a transparent multilayer film includes a polymeric substrate film and a fluoropolymer film. The fluoropolymer film includes a vinyl fluoride polymer, 2 to 8 wt % of an acrylate polymer and 0.1 to 4 wt % of a triazine UV absorber. After heating at 100° C. for 96 hours, the transparent fluoropolymer film has a 340 nm absorbance of at least 1.5.

In one embodiment of the second aspect, the transparent multilayer film further includes an adhesive layer.

In another embodiment of the second aspect, a photovoltaic module includes a frontsheet, a solar cell layer and a backsheet. The frontsheet, the backsheet, or both the frontsheet and the backsheet include the transparent multilayer film of the second aspect.

In a third aspect, an article includes a substrate and a transparent fluoropolymer film. The substrate includes a material selected from the group consisting of plastics, metals and woods. The transparent fluoropolymer film includes a vinyl fluoride polymer, 2 to 8 wt % of an acrylate polymer and 0.1 to 4 wt % of a triazine UV absorber. After heating at 100° C. for 96 hours, the transparent fluoropolymer film has a 340 nm absorbance of at least 1.5.

In one embodiment of the third aspect, plastics include a polymeric substrate and a graphic image.

Many aspects and embodiments have been described above and are merely exemplary and not limiting. After reading this specification, skilled artisans appreciate that other aspects and embodiments are possible without departing from the scope of the invention. Other features and advantages of the invention will be apparent from the following detailed description, and from the claims.

In conventional multilayer backsheets used for photovoltaic modules, pigments, such as titanium dioxide, are used in a fluoropolymer outer film layer to opacify the film and protect the backsheet against UV degradation. In order to use similar backsheet films in a bifacial module structure, however, other approaches, that do not opacify the backsheet, are needed. U.S. Patent Application Publication No. 2015/0299498 A1 describes the use of light stabilizers, including UV absorbers and hindered amine light stabilizers (HALS), in fluoropolymer coating compositions with polyvinyl fluoride (PVF) to provide protection against UV degradation. It has been found, however, that films formed from these coating compositions become susceptible to UV degradation over time due to the diffusion of the small molecule light stabilizers to the surface of the fluoropolymer coating, where they can be readily removed from the outer fluoropolymer layer that is exposed to the environment. In the present disclosure, blending an acrylate polymer with a vinyl fluoride polymer has been found to prevent the diffusion of UV absorber from the bulk of a transparent fluoropolymer film, thus maintaining its ability to resist UV degradation over long periods of time, making it an ideal replacement for glass in a PV module. In one embodiment, after heating at 100° C. for 96 hours, the transparent fluoropolymer film has a 340 nm absorbance of at least 1.5.

Fluoropolymers

Fluoropolymers useful in a transparent fluoropolymer film are selected from homopolymers and copolymers of vinyl fluoride (VF) comprising at least 60 mole % vinyl fluoride. In a more specific embodiment, the fluoropolymer is selected from homopolymers and copolymers of vinyl fluoride comprising at least 80 mole % vinyl fluoride. Homopolymer polyvinyl fluoride (PVF) is well suited for the practice of specific aspects of the invention.

In one embodiment, with VF copolymers, comonomers can be either fluorinated or nonfluorinated or combinations thereof. By the term "copolymers" is meant copolymers of VF with any number of additional fluorinated or nonfluorinated monomer units so as to form dipolymers, terpolymers, tetrapolymers, etc. If nonfluorinated monomers are used, the amount used should be limited so that the copolymer retains the desirable properties of the fluoropolymer, i.e., weather resistance, solvent resistance, barrier properties, etc. In one embodiment, fluorinated comonomers are used including fluoroolefins, fluorinated vinyl ethers, or fluorinated dioxoles. Examples of useful fluorinated comonomers include tetrafluoroethylene (TFE), hexafluoropropylene (HFP), chlorotrifluoroethylene (CTFE), trifluoroethylene, hexafluoroisobutylene, perfluorobutyl ethylene, perfluoro (propyl vinyl ether) (PPVE), perfluoro (ethyl vinyl ether) (PEVE), perfluoro (methyl vinyl ether) (PMVE), perfluoro-2,2-dimethyl-1,3-dioxole (PDD) and perfluoro-2-methylene-4-methyl-1,3-dioxolane (PMD) among many others.

Acrylate Polymers

Acrylates are the esters, salts, and conjugate bases of acrylic acid and its derivatives. Acrylates and methacrylates (the esters and salts of methacrylic acid) are common monomers in polymer plastics and form many useful acrylate polymers. Such polymers are generally noted for their transparency and resistance to degradation in an outdoor environment. In one embodiment, an acrylate polymer useful in a transparent fluoropolymer film is selected from homopolymers and copolymers of methacrylates. In one embodiment, a methacrylate polymer is polymethyl methacrylate. In one embodiment, with methacrylate copolymers, comonomers can include ethyl acrylates, butyl acrylates, 2-ethylhexyl acrylates, acrylic acids and methacrylic acids among many others.

Light Stabilizers

In one embodiment, a transparent fluoropolymer film can contain one or more light stabilizers. Light stabilizer can include compounds that absorb ultraviolet radiation such as hydroxybenzophenones, hydroxyphenyl-triazines (HPT) and hydroxybenzotriazoles. These UV absorbers can protect the transparent fluoropolymer film and other underlying layers from degradation that can result from long-term UV exposure. UV absorbers convert damaging UV radiation into heat. In one embodiment, HPTs, which have large extinction coefficients and high photostability, can be used. A large extinction coefficient enables the use of the minimum number of UV absorber molecules for a desired level of absorbance, while a high photostability ensures that HPTs resist photodegradation when exposed to UV light for a long time. In one embodiment, a hydroxyphenyl-triazine can include 2-hydroxyphenyl-s-triazine (such as Tinuvin® 479 or Tinuvin® 460, BASF Corporation, Wyandotte, Mich.).

In one embodiment, light stabilizers can include hindered amine light stabilizers (HALS), such as bis(1,2,2,6,6-pentamethyl-4-piperidyl) sebacate, methyl 1,2,2,6,6-pentamethyl-4-piperidyl sebacate, bis(2,2,6,6-tetramethyl-4-piperidyl) sebacate (e.g., Tinuvin® 770, BASF Corporation) and poly(4-hydroxy-2,2,6,6-tetramethyl-1-piperidine ethanol-alt-1,4-butanedioic acid) (e.g., Tinuvin® 622, BASF Corporation). These molecules neutralize free radicals generated by photodegradation in a polymer film. In one embodiments a HALS can be a combination of bis(1,2,2,6,6-pentamethyl-4-piperidyl) sebacate and methyl 1,2,2,6,6-pentamethyl-4-piperidyl sebacate (e.g., Tinuvin® 292, BASF Corporation).

In one embodiment, a light stabilizer can include both a UV absorber and a HALS, such as a combination of Tinuvin® 479, Tinuvin® 460 and Tinuvin® 292. In a specific embodiment a ratio of UV absorber to HALS is in a range of from about 1:1 to about 3:1, or from about 1.5:1 to about 2:1.

Filler Particles

In one embodiment, a transparent fluoropolymer film can include filler particles. In a specific embodiment, the filler particles can be spherical or platelet-shaped particles. The incorporation of these particles can provide a barrier to water, solvents, or gases, such as oxygen, preventing penetration to the interior layers of the laminate structure. The filler particles can also provide anti-blocking functionality or be used as slip additives to improve film handling and/or roll formation.

Examples of typical spherical or platelet-shaped particles include, silicon dioxide, glass flake, zinc oxide, titanium dioxide, aluminum oxide, mica, talc, clay, stainless steel, and aluminum. Preferably, the filler particles are transparent, such as silicon dioxide or glass, in order to maintain good optical transmission of the film. The particles are also preferably matched to the refractive index of the polymer, limiting increases in haze due to excessive refraction of light by particles whose refractive indices are significantly different than the polymer. The particles can also have nanoscale dimensions in order to minimize the refraction of light and improve the optical properties of the film. In some embodiments, these particles have an average particle size in the range of from about 10 nm to about 30 μm, or from about 1 μm to about 20 μm, with no more than 50% of the particles having an average particle size of more than about 20 μm.

Other additives, while not generally needed or used, such as fiber glass and mineral fillers, anti-slip agents, plasticizers, nucleating agents, and the like, can be incorporated into the film. In one embodiment, thermal stabilizers (e.g., triphenyl phosphite) can also be used.

Transparent Fluoropolymer Films

Liquid fluoropolymer compositions can contain the fluoropolymer either in the form of a solution or dispersion of the fluoropolymer resin. Typical solutions or dispersions for the fluoropolymer are prepared using solvents which have boiling points high enough to avoid bubble formation during the film forming/drying process. For polymers in dispersion form, a solvent which aids in coalescence of the fluoropolymer is desirable. The polymer concentration in these solutions or dispersions is adjusted to achieve a workable viscosity of the solution and will vary with the particular polymer, the other components of the composition, and the process equipment and conditions used. In one embodiment, for dispersions, the fluoropolymer is present in an amount of from about 25 to about 50 wt % based on the total weight of the liquid fluoropolymer composition.

In one embodiment, using homopolymer polyvinyl fluoride (PVF), suitable formulations are prepared using dispersions of the fluoropolymer. The nature and preparation of dispersions are described in detail in U.S. Pat. Nos. 2,419,008; 2,510,783; and 2,599,300. In a specific embodiment, PVF dispersions are formed in propylene carbonate (PC), γ-butyrolactone (GBL), N-methyl pyrrolidone (NMP), dimethyl acetamide (DMAC) or dimethylsulfoxide (DMSO). In addition, these dispersions can contain co-solvents to facilitate the film-forming process.

Acrylate polymers and light stabilizers, such as UV absorbers and HALS, can be used in the liquid fluoropolymer composition in the form of a solution or dispersion. Both acrylate polymers and light stabilizers can form solutions in the solvents described above for the fluoropolymer.

To prepare the liquid fluoropolymer composition in dispersion form, the fluoropolymer resin can be milled in a suitable solvent. Components which are soluble in the solvent do not require milling. A wide variety of mills can be used for the preparation of fluoropolymer dispersions. Typically, the mill employs a dense agitated grinding medium, such as sand, steel shot, glass beads, ceramic shot, zirconia, or pebbles, as in a ball mill, an ATTRITOR® available from Union Process, Akron, Ohio, or an agitated media mill such as a "Netzsch" mill available from Netzsch, Inc., Exton, Pa. The fluoropolymer dispersion is milled for a time sufficient to cause de-agglomeration of the PVF particles. Typical residence time of the dispersion in a Netzsch mill ranges from thirty seconds up to ten minutes. Milling conditions of the fluoropolymer dispersion (e.g., temperature) are controlled to avoid swelling or gelation of the fluoropolymer particles. The acrylate polymer and light stabilizer can be dissolved individually in the same, or a different, solvent as that used to disperse the fluoropolymer, and then added to the liquid fluoropolymer composition.

In one embodiment, a liquid fluoropolymer composition can have an overall solids content in the range of from about 10 to about 60 wt %, or from about 20 to about 50 wt %, or from about 30 to about 45 wt %. The term "overall solids content" when used herein is expressed as a weight percentage of the dry solids in the composition relative to the overall weight of the liquid fluoropolymer composition (including both wet and dry components).

Fluoropolymer films can be formed from liquid fluoropolymer compositions using any number of film-forming techniques. Conventional techniques for producing such films include casting, dipping, spraying, painting, and extrusion. In these methods, films are deposited as wet dispersions or solutions and subsequently dried and coalesced thermally. These wet methods depend on organic solvents and require resin particle sizes in the submicron range to prepare suitable dispersions. Processing the dispersions requires milling to assure the small particle sizes, and high temperature ovens to dry the dispersions and coalesce the resin into a high quality film. For reasons of economy and the environment, the spent solvents can be recovered after the film is cast and refined to be reused.

When the fluoropolymer in the composition is in dispersion form, it is necessary for the solvent to be removed, and also for the fluoropolymer to be heated to a sufficiently high temperature that the fluoropolymer particles coalesce into a continuous film. Removing of the solvent can be achieved in a single heating or by multiple heatings. In one embodiment, a liquid fluoropolymer composition cast on a web substrate is heated to a cure temperature of about 150 to about 250° C. The conditions used to coalesce the fluoropolymer will vary with the fluoropolymer used, the solvent chosen, the thickness of the cast dispersion and the substrate film, and other operating conditions. For homopolymer PVF compositions, and residence times of about 1 to about 6 minutes, oven temperatures of from about 160° C. to about 250° C. can be used to coalesce the film, and temperatures of about 190 to about 230° C. have been found to be particularly satisfactory. The oven air temperatures, of course, may not be representative of the temperatures reached by the fluoropolymer composition, which may be lower. In one embodiment, transparent fluoropolymer films have a dry thickness of from about 10 to about 200 µm. In a specific embodiment, transparent fluoropolymer films have a dry thickness of from about 20 to about 75 µm.

Transparent fluoropolymer films can be used to make high quality protective films with good transparency and low haze on a wide variety substrates such as metal, plastic, ceramic, stone, glass, concrete, fabric and wood. As used herein, the term "substrate" refers to a surface to which a transparent fluoropolymer film can be adhered. In one example, for signage or graphic arts, a polymeric substrate may include a polymeric film and a printed layer containing dyes or inks. The polymeric film may itself also contain dyes or inks, and the polymeric film may include more than one polymeric layer. An adhesive layer may or may not be used to adhere the fluoropolymer film to the polymeric substrate film. In another example, for architectural building and construction applications, a substrate may include any number of layers which may include a wide variety of materials. A transparent fluoropolymer film may be adhered to the substrate to protect, not only to the layer to which it is directly adhered, but to any number of layers that make up the substrate.

Chemical resistance is a key characteristic of fluoropolymer films that makes them good protective films. By blending acrylate polymer into PVF, however, the chemical resistance of the PVF can be compromised, so it is important to limit the amount of acrylate polymer included in the film. In one embodiment, transparent fluoropolymer films have excellent solvent stability, maintaining their good optical properties even after exposure to organic solvents. In one embodiment, transparent fluoropolymer films of the present invention can have a transmission of at least 80%, or at least 90%, when measured using ASTM standard D1003-13, after soaking in MEK solvent for 29 hours at room temperature. In one embodiment, transparent fluoropolymer films of the present invention can have a haze of less than 50%, or less than 40%, or less than 30%, when measured using the standard ASTM D1003-13, after soaking in MEK solvent for 29 hours at room temperature.

In one embodiment, mechanical, optical and/or barrier properties of a transparent fluoropolymer film, including tensile strength and modulus of elasticity, can be improved by stretching, or orienting, the film. The term "oriented", as used herein, refers to an orientation process, under which a polymeric film or sheet is uni-axially or bi-axially stretched in the transverse direction (TD) and/or machine direction (MD). As used herein, the terms "film" and "sheet" are used interchangeably in reference to the transparent fluoropolymer film. For those skilled in the art, film may, at times, refer to a thinner layer, for instance one less than 100 µm, and sheet may, at times, refer to a thicker layer, for instance one more than 100 µm, however, in the context of the transparent fluoropolymer film disclosed herein, the invention encompasses both thin layers (films) and thick layers (sheets). Stretching apparatus and processes to obtain uni-axially or bi-axially oriented films or sheets are known in the art and may be adapted by those skilled in the art to produce the films or sheets disclosed herein. Examples of such apparatus and processes include, for example, those disclosed in U.S. Pat. Nos. 3,278,663; 3,337,665; 3,456,044; 4,590,106; 4,760,116; 4,769,421; 4,797,235; and 4,886,634. For uni-axial orientation, a film, in the form of a continuous web, may be passed over heated rollers to raise the temperature of the film to the necessary stretching temperature, and then by adjusting the speeds of the subsequent rollers, the film can be stretched in the machine direction. For bi-axial orientation, a film, once again in the form of a continuous web, may be stretched either sequentially using rollers for machine direction stretching and a tenter frame for transverse stretching, or simultaneously in an appropriately equipped tenter to properly orient the film and thereby improve its properties. In a third technique for bi-axial orientation, the stretching operation may be carried out by extruding film in tubular form and stretching in an appropriate apparatus using a combination of tubular expansion and machine-direction stretching techniques.

In one embodiment, a transparent fluoropolymer film contains from about 88 to about 97.9 wt % of a vinyl fluoride polymer, from about 2 to about 8 wt % of an acrylate polymer and from about 0.1 to about 4 wt % of a triazine UV absorber. In a specific embodiment, the transparent fluoropolymer film contains from about 2 to about 7 wt % of the acrylate polymer, or from about 4 to about 6 wt % of the acrylate polymer. In another specific embodiment, the transparent fluoropolymer film contains from about 0.5 to about 3 wt % of the triazine UV absorber, or from about 1 to about 2.5 wt % of the triazine UV absorber. In one embodiment, a ratio of acrylate polymer to triazine UV absorber is in a range of from about 2.5:1 to about 8:1. In a specific embodiment, the ratio of acrylate polymer to triazine UV absorber is about 4:1.

Multilayer Films

In one embodiment, transparent fluoropolymer films can be used in combination with a polymeric substrate film to form a transparent multilayer film. Polymeric substrate films for transparent multilayer films can be selected from a wide range of polymers, with thermoplastics being desirable for their ability to withstand higher processing temperatures. In one embodiment, the polymeric substrate film is a polyester, a polyamide, a polyimide, a polyolefin or a polycarbonate. In a specific embodiment, a polyester for the polymeric substrate film is selected from polyethylene terephthalate, polyethylene naphthalate, polybutylene terephthalate, and a co-extrudate of polyethylene terephthalate/polyethylene naphthalate.

Fillers can also be included in the substrate film, where their presence may improve the physical properties of the substrate, for example, higher modulus and tensile strength. They may also improve adhesion of the fluoropolymer film to the polymeric substrate film. One exemplary filler is barium sulfate, although others can also be used. In one embodiment, a polymeric substrate film can have a thickness in the range of from about 12.5 µm (0.5 mil) to about 250 µm (10 mil).

The fluoropolymer film and polymeric substrate film can be laminated together to form a transparent multilayer film. In one embodiment, an adhesive is used between the films. In some embodiments, the polymeric substrate can be coated or extruded directly on the fluoropolymer film without an adhesive present. The surface of the fluoropolymer film and polymeric substrate film may naturally possess some functional groups suitable for bonding to each other, as in hydroxyl and/or carboxylic acid groups in a polyester film, or amine and/or acid functionality in a polyamide film. Often, these films may need, or would further benefit from, modifying to provide additional functional groups suitable for bonding to the fluoropolymer film, and this may be achieved by surface treatment, or surface activation. That is, the surface can be made more active by forming functional groups of carboxylic acid, sulfonic acid, aziridine, amine, isocyanate, melamine, epoxy, hydroxyl, anhydride and/or combinations thereof on the surface. In one embodiment, the surface activation can be achieved by chemical exposure, such as to a gaseous Lewis acid such as $BF_3$ or to sulfuric acid or to hot sodium hydroxide. Alternatively, the surface can be activated by exposing one or both surfaces to an open flame while cooling the opposite surface. Surface activation can also be achieved by subjecting the film to a high frequency, spark discharge such as corona treatment or atmospheric nitrogen plasma treatment. Additionally, surface activation can be achieved by incorporating compatible comonomers into the polymeric substrate when forming a film. Those skilled in the art will appreciate the wide variety of processes that may be used to form compatible functional groups on the surface of a polymeric substrate film.

In addition, a primer or adhesive layer, applied to the surface of the fluoropolymer film, the polymeric substrate film, or both the fluoropolymer and polymeric substrate films can be used to laminate the fluoropolymer film to the polymeric substrate film. The primer or adhesive layer can be made from a number of different polymeric materials, including but not limited to acrylates, polyesters, epoxides, polyurethanes, and cyanoacrylates. The adhesives can be one-part, two-part, or a pre-made film. The adhesive can be thermoplastic, thermoset, or pressure sensitive. For a one-part adhesive, the adhesive can be coated from a solvent solution, the solvent dried in ambient conditions or with application of heat. The contact between the substrate and the fluoropolymer film can be made in a nip roll, press, or vacuum laminator with time and temperature conditions sufficient to bond the materials. For a two-part adhesive, the reactive components are mixed, the adhesive coated from a solvent solution, and the solvent dried in ambient conditions or with application of heat. The contact between the substrate and the fluoropolymer film can be made in a nip roll, press, or vacuum laminator with time and temperature conditions sufficient to bond the materials. For a pressure sensitive adhesive, the adhesive can be laminated on either the substrate or the fluoropolymer film, and the adhesive-coated material pressed into the non-adhesive coated material in a nip roll, press, or vacuum laminator, typically at room temperature but occasionally at elevated temperatures. The temperature is restricted by the decomposition of the substrate, adhesive, or fluoropolymer film. In one embodiment, a two-part polyester adhesive is mixed, coated onto a PET substrate using a doctor blade, the solvent dried in an oven at 55° C., and the bond made using contact between the substrate and the fluoropolymer film in a nip roll where the temperature of the nip is held at 130° C.

Applications

Transparent fluoropolymer films can be used in a broad range of applications where good transparency and low haze, as well as improved UV resistance, permeation resistance, chemical resistance and/or lower surface tension are desired. In addition to films for photovoltaic backsheets and frontsheets, transparent fluoropolymer films can be used in weather-resistant and anti-graffiti signage and as architectural films.

In a bifacial PV module, incident light enters the module from both the front and back surfaces of the module to irradiate the solar cell layer, providing enhanced power output compared to a module for which incident light is only captured on the front side. By replacing heavy and brittle glass with a transparent fluoropolymer film for the frontsheet, the backsheet or both the frontsheet and backsheet, the weight of the module can be greatly reduced. This reduced weight can lead to simplified load requirements for the racking or the structure on which the racking in mounted, such as a building rooftop. The lighter weight also makes conveyance of the module simpler during manufacturing and transport, reducing lifting and packaging requirements. The use of a polymeric backsheet or frontsheet may lead to lower operating temperature and higher solar cell efficiency due to the IR blocking capability of the polymer film, as well as the reduced film thickness which promotes heat transfer from the cells into the environment. The breakage rate of the module can be reduced in transport, installation, and use by replacing the rigid and brittle glass with a light and flexible polymer.

In signage and graphic art applications, a transparent fluoropolymer film can be placed on the outer surface of a laminate containing a graphic image. In one embodiment, the graphic image can contain a polymeric substrate onto which an image is printed using an ink. The fluoropolymer film can be adhered to this printed substrate using an adhesive, for example, a pressure sensitive adhesive. The composite laminate provides beautification or conveyance of printed information. Such a laminate can be used in a variety of applications, such as for signs and labels (e.g., as a surface covering for the exterior of truck carriage boards, buses, boats, or automobiles), or as beautification films used on outdoor enclosures in heavily trafficked areas. The fluoropolymer film on the outer surface of the laminate provides additional solvent resistance, which in turn provides a greater number of options for cleaning or graffiti removal. The low surface energy of the transparent fluoropolymer film also reduces the dirt accumulation rate in signage and graphic art applications. The UV protection in the fluoropolymer film can further protect the dyes and pigments in the ink underlying the fluoropolymer film from degradation, providing color stability for the graphic image.

In architectural building and construction applications, a transparent fluoropolymer film can be placed on the outer surface of a laminate containing a graphic image, in a similar manner as described above for signage and graphic art applications. Alternatively, a veneer or natural material, such as wood, ceramic, or stone, can be used as a substrate onto which a transparent fluoropolymer film is applied. The fluoropolymer film can be adhered to substrates using an adhesive, for example, a pressure sensitive or a one- or two-part solvent-based adhesive. The composite laminate provides beautification to the exterior or interior of buildings. The fluoropolymer film on the outer surface of the laminate provides additional solvent resistance, which in turn provides a greater number of options for cleaning or graffiti removal. The low surface energy of the transparent fluoropolymer film also reduces the dirt accumulation rate in architectural building and construction applications. The UV protection in the fluoropolymer film can further protect any dyes, pigments, or natural colorants in the substrate from degradation, providing stabilization to the appearance of the material.

EXAMPLES

The concepts described herein will be further described in the following examples, which do not limit the scope of the invention described in the claims.

Test Methods

UV Absorber Heat Stability

Film samples were analyzed for initial UV-Vis transmission using a Lambda 950 UV-Vis Spectrophotometer (PerkinElmer, Waltham, Mass.). UV-Vis transmission spectra were measured from 290 to 800 nm. After each sample was measured for initial UV-Vis transmission, the films were placed in a 100° C. oven to drive diffusion of the UV absorber out of the film. The films were pulled from the oven at certain intervals, wiped off with a cloth that has been made damp with acetone to remove excess UV absorbers from the surface of the film, measured, and returned to the oven for more aging. The measurement is a UV-Vis analysis, which determines how much light is absorbed by the film at each different wavelength of light. The absorbance, a term defined as $A=2-\log_{10}$ (% T), where % T is the measured transmission, is directly proportional to the number of active UV absorber molecules left in the polyvinyl fluoride film in the region above 300 nm where the polymer itself does not absorb substantially.

Solvent Resistance

Film samples were tested for solvent resistance by soaking for 29 hours in a bath of MEK solvent. Transmission, haze and clarity were measured following ASTM D1003-13 on films with a dry thickness of 25 μm.

Super UV Stability

Film samples were analyzed for initial UV-Vis transmission using a Lambda 950 UV-Vis Spectrophotometer. UV-Vis transmission spectra were measured from 290 to 800 nm. After each sample was measured for initial UV-Vis transmission, the films were placed into an EYE Super UV Tester (Iwasaki Electric Co., Ltd., Japan). The films were continuously irradiated with 1250 W/m$^2$ of UV light with wavelengths from 297-450 nm. The temperature was maintained at 52° C. with 50% relative humidity. At fixed 50 hour intervals during the exposure, the samples were removed from the test chamber and examined using the UV-Vis Spectrophotometer.

Examples 1-4 and Comparative Examples 1-3

For Examples 1-4 (E1-E4) and Comparative Examples 1-3 (CE1-CE3), PVF polymer (E.I. du Pont de Nemours & Co., Wilmington, Del.) was dispersed in N-methyl-2-pyrrolidone (NMP) solvent to 42 wt %. Separately, a high molecular weight PMMA (Elvacite® 2021, Lucite International Inc., Cordova, Tenn.) was dissolved in NMP to 20 wt %. UV absorbers, Tinuvin® 479 and 460 (BASF Corp.), 2-hydroxyphenyl-s-triazines, at 33 and 20 wt %, respectively, and an antioxidant/heat stabilizer, Irganox® 1035 (BASF Corp.) at 27 wt %, were also dissolved in separate solutions in NMP. A hindered amine light stabilizer, Tinuvin® 292 (BASF Corp.), a combination of bis(1,2,2,6,6-pentamethyl-4-piperidyl) sebacate and methyl 1,2,2,6,6-pentamethyl-4-piperidyl sebacate was used as-received. These materials were combined so that, in dry films, the transparent fluoropolymer films contained 0.8 wt % Tinuvin® 479, 0.4 wt % Tinuvin® 460, 0.75 wt % Tinuvin® 292, and 0.25 wt % Irganox® 1035. The transparent fluoropolymer films also contained Elvacite® 2021 PMMA at levels of 0 (CE1), 2 (E1), 4 (E2), 6 (E3), 8 (E4), 10 (CE2) and 12 (CE3) wt % in the dry film.

These solutions were coated onto a 10 mil PET web using a reverse gravure coater. The films were dried at 190° C., with the line moving at 15 ft/min in two zones (5 ft and 10 ft length). In the first zone, the top of the sample is arranged to minimize moving air over the sample to prevent excessive solvent loss while the PVF coalesces into a continuous film. In the second zone, convection is used to remove solvent from the film. The dry film thickness was 25 μm.

Table 1 summarizes the peak absorbance of the transparent fluoropolymer films during UV absorber stability testing at 100° C., where the films are removed and the UV-Vis transmission is measured at the intervals indicated. UV degradation resistance of films can be shown by measuring transmission, or absorbance, at 340 nm. Table 2 summarizes the 340 nm absorbance during the same testing. The retention of the UV absorbers is improved as the amount of PMMA is increased.

TABLE 1

| | Example | | | | | | |
|---|---|---|---|---|---|---|---|
| | CE1 | E1 | E2 | E3 | E4 | CE2 | CE3 |
| PMMA (wt %) | 0 | 2 | 4 | 6 | 8 | 10 | 12 |
| 0 hr @100° C. | 2.94 | 2.96 | 2.71 | 2.89 | 2.66 | 2.58 | 2.39 |
| 22 hr @100° C. | 1.99 | 2.11 | 2.40 | 2.51 | 2.34 | 2.46 | 2.34 |
| 96 hr @100° C. | 1.26 | 1.61 | 1.98 | 2.09 | 2.17 | 2.38 | 2.26 |
| 144 hr @100° C. | 1.03 | 1.37 | 1.79 | 1.96 | 2.13 | 2.25 | 2.11 |
| 192 hr @100° C. | 1.01 | 1.31 | 1.68 | 1.93 | 1.96 | 2.19 | 2.09 |
| 264 hr @100° C. | 0.94 | 1.35 | 1.60 | 1.74 | 1.79 | 2.24 | 1.99 |

TABLE 2

| | Example | | | | | | |
|---|---|---|---|---|---|---|---|
| | CE1 | E1 | E2 | E3 | E4 | CE2 | CE3 |
| PMMA (wt %) | 0 | 2 | 4 | 6 | 8 | 10 | 12 |
| 0 hr @100° C. | 2.73 | 2.76 | 2.55 | 2.72 | 2.50 | 2.44 | 2.26 |
| 22 hr @100° C. | 1.86 | 1.99 | 2.26 | 2.36 | 2.20 | 2.32 | 2.21 |
| 96 hr @100° C. | 1.19 | 1.52 | 1.87 | 1.97 | 2.04 | 2.24 | 2.14 |
| 144 hr @100° C. | 0.97 | 1.29 | 1.68 | 1.84 | 2.01 | 2.13 | 1.99 |
| 192 hr @100° C. | 0.95 | 1.23 | 1.58 | 1.81 | 1.84 | 2.07 | 1.97 |
| 264 hr @100° C. | 0.88 | 1.27 | 1.50 | 1.64 | 1.67 | 2.10 | 1.87 |

The transparent fluoropolymer films were tested for solvent resistance by soaking for 29 hours in MEK solvent. Before soaking, all of the films have high transmission and low haze. After soaking, however, only films with less than 8% PMMA maintain their low haze. The other films are remarkably changed in appearance. This suggests that, above this threshold level of PMMA, there is a structural change in the film and the PMMA is able to be leached out by the solvent. Table 3 summarizes these results.

TABLE 3

| Example | PMMA (wt %) | Before Soaking | | | After Soaking | | |
|---|---|---|---|---|---|---|---|
| | | Transmission (%) | Haze (%) | Clarity (%) | Transmission (%) | Haze (%) | Clarity (%) |
| CE1 | 0 | 93.8 | 4.84 | 95.3 | 94.8 | 5.77 | 95.2 |
| E1 | 2 | 93.8 | 5.28 | 95.1 | 94.2 | 5.05 | 94.9 |
| E2 | 4 | 93.2 | 6.12 | 94.7 | 94.1 | 7.19 | 94.8 |
| E3 | 6 | 93.1 | 6.65 | 95.2 | 93.8 | 9.98 | 95.0 |
| E4 | 8 | 93.1 | 6.92 | 95.1 | 64.8 | 85.2 | 87.5 |
| CE2 | 10 | 92.8 | 7.22 | 94.7 | 56.3 | 90.7 | 91.7 |
| CE3 | 12 | 92.8 | 6.02 | 94.8 | 55.5 | 93.0 | 92.2 |

E1-E4 demonstrate that a maximal amount of PMMA is desired to have the highest solubility and therefore the greatest stability of the UV absorber in the composite film. However, too much acrylate polymer can cause a loss in the highly desirable solvent resistance property of the transparent fluoropolymer film.

Example 5 and Comparative Examples 6-7

For Example 5 (E5), PVF polymer was added to DMAC to make a 42 wt % dispersion. Separately, PMMA (Aldrich 182230-500G–$M_w$=120,000, $T_g$=105° C.) was dissolved in dimethylacetamide (DMAC) to 20 wt % solids. An additive package was prepared using 200 mg of Tinuvin® 479, 100 mg of Tinuvin® 460, 62.5 mg of Irganox® 1035, dissolved in 1.2 g of DMAC to a 20 wt % concentration. A dispersion mixture was made using 0.325 g of the UV additive package, 1.5 g of the PMMA solution, and 11.04 g of the PVF dispersion. This PVF dispersion mixture was cast on a glass plate using a 5 mil doctor blade. The coated glass was placed in an oven at 160° C. with a metal "tophat" enclosure on top of the film to prevent excessive solvent evaporation, where it was held for 3 mins. After this time, the tophat was removed and the solvent allowed to evaporate for 3 mins. The glass was removed, allowed to cool, and the PVF film removed from the glass using warm running water. The dry film thickness was 25 µm.

For Comparative Examples 6-7 (CE6-CE7), PVDF (Aldrich, 180 k MW) was dissolved in DMAC to 20 wt % solids. The 20 wt % PMMA solution and 20 wt % additive package, as described above for E5, were used. A solution was made using 0.325 g of the UV additive package, 1.5 g of PMMA solution, and 23.18 g of the PVDF solution.

For CE6, the PVDF solution was cast onto a glass plate using a 15 mil doctor blade. The coated glass was placed in an oven at 160° C. with a metal "tophat" enclosure on top of the film to prevent excessive solvent evaporation, where it was held for 3 mins. After this time, the tophat was removed and the solvent allowed to evaporate for 3 mins. The glass was removed, allowed to cool, and the PVDF film removed from the glass using warm running water. The dry film thickness was 25 µm.

For CE7, the PVDF solution was cast onto a glass plate using a 15 mil doctor blade. The coated glass was placed in an oven at 90° C. to evaporate the solvent for 15 mins. The glass was removed, allowed to cool, and the PVDF film removed from the glass using warm running water. The dry film thickness was 25 µm.

Initial UV-Vis transmission measurements were made on the transparent fluoropolymer films and the initial absorbance was calculated. The samples were then subjected to Super UV testing and transmission spectra were measured after 50 and 100 hours of exposure. From the transmission data, the amount of UV absorber in the film was calculated. The PVF film (E5) maintained a low level of UV transmission at 340 nm, while the PVDF films (CE6 and CE7) showed an increase in 340 nm transmission over time. Using the absorbance as a measure of active UV absorber concentration, the UV absorber is depleted in the PVDF film at a much faster rate. Table 4 summarizes these results.

TABLE 4

| | Example | | |
|---|---|---|---|
| | E5 | CE6 | CE7 |
| PMMA (wt %) | 6 | 6 | 6 |
| Initial 340 nm Absorbance | 3.46 | 3.18 | 3.41 |
| Initial 340 nm Transmission (%) | 0.0359 | 0.0661 | 0.0392 |
| 50 hr 340 nm Transmission (%) | 0.238 | 31.0 | 43.3 |
| 100 hr 340 nm Transmission (%) | 1.17 | 41.8 | 54.5 |
| Initial UV Absorber (%) | 100 | 100 | 100 |
| 50 hr UV Absorber (%) | 76.1 | 16.0 | 10.7 |
| 100 hr UV Absorber (%) | 56.0 | 11.9 | 7.75 |

Note that not all of the activities described above in the general description or the examples are required, that a portion of a specific activity may not be required, and one or more further activities may be performed in addition to those described. Still further, the order in which activities are listed are not necessarily the order in which they are performed. After reading this specification, skilled artisans will be capable of determining what activities can be used for their specific needs or desires.

In the foregoing specification, the invention has been described with reference to specific embodiments. However, one of ordinary skill in the art appreciates that one or more modifications or one or more other changes can be made without departing from the scope of the invention as set forth in the claims below. Accordingly, the specification and figures are to be regarded in an illustrative rather than a restrictive sense and any and all such modifications and other changes are intended to be included within the scope of invention.

Any one or more benefits, one or more other advantages, one or more solutions to one or more problems, or any combination thereof has been described above with regard to one or more specific embodiments. However, the benefit(s), advantage(s), solution(s) to problem(s), or any element(s) that may cause any benefit, advantage, or solution to occur or become more pronounced is not to be construed as a critical, required, or essential feature or element of any or all of the claims.

It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any sub-combination. Further, reference to values stated in ranges include each and every value within that range.

What is claimed is:

1. A transparent fluoropolymer film comprising:
   a vinyl fluoride polymer;
   2 to 8 wt % of an acrylate polymer; and
   0.1 to 4 wt % of a triazine UV absorber, wherein after heating at 100° C. for 96 hours, the transparent fluoropolymer film has a 340 nm absorbance of at least 1.5.

2. The transparent fluoropolymer film of claim 1, further comprising a hindered amine light stabilizer.

3. The transparent fluoropolymer film of claim 2, wherein the hindered amine light stabilizer comprises bis(1,2,2,6,6-pentamethyl-4-piperidyl) sebacate, methyl 1,2,2,6,6-pentamethyl-4-piperidyl sebacate, bis(2,2,6,6-tetramethyl-4-piperidyl) sebacate, poly(4-hydroxy-2,2,6,6-tetramethyl-1-piperidine ethanol-alt-1,4-butanedioic acid), or a mixture thereof.

4. The transparent fluoropolymer film of claim 1, wherein the triazine UV absorber comprises 2-hydroxyphenyl-s-triazine.

5. The transparent fluoropolymer film of claim 1, wherein after soaking in methyl ethyl ketone solvent for 29 hours at room temperature, the transparent fluoropolymer film has a haze of less than 50%.

6. The transparent fluoropolymer film of claim 1, wherein after soaking in methyl ethyl ketone solvent for 29 hours at room temperature, the transparent fluoropolymer film has a transmission of at least 80%.

7. The transparent fluoropolymer film of claim 1, wherein the acrylate polymer comprises a methacrylate polymer.

8. The transparent fluoropolymer film of claim 7, wherein the methacrylate polymer comprises polymethyl methacrylate.

9. The transparent fluoropolymer film of claim 1, wherein the acrylate polymer is a copolymer comprising a methacrylate monomer and one or more comonomers.

10. The transparent fluoropolymer film of claim 9, wherein the one or more comonomers comprise an ethyl acrylate, a butyl acrylate, a 2-ethylhexyl acrylate, an acrylic acid, a methacrylic acid or a mixture thereof.

11. The transparent fluoropolymer film of claim 1, wherein a ratio of acrylate polymer to triazine UV absorber is in a range of from about 2.5:1 to about 8:1.

12. The transparent fluoropolymer film of claim 11, wherein the ratio of acrylate polymer to triazine UV absorber is about 4:1.

13. The transparent fluoropolymer film of claim 2, wherein a ratio of UV absorber to hindered amine light stabilizer is in a range of from about 1:1 to about 3:1.

14. The transparent fluoropolymer film of claim 13, wherein the ratio of UV absorber to hindered amine light stabilizer is in a range of from about 1.5:1 to about 2:1.

15. The transparent fluoropolymer film of claim 1, wherein the fluoropolymer film has a thickness of from about 10 to about 200 μm.

16. The transparent fluoropolymer film of claim 15, wherein the fluoropolymer film has a thickness of from about 20 to about 75 μm.

17. A transparent multilayer film comprising a polymeric substrate film and a fluoropolymer film, wherein the fluoropolymer film comprises:
   a vinyl fluoride polymer;
   2 to 8 wt % of an acrylate polymer; and
   0.1 to 4 wt % of a triazine UV absorber, wherein after heating at 100° C. for 96 hours, the transparent fluoropolymer film has a 340 nm absorbance of at least 1.5.

18. The transparent multilayer film of claim 17, further comprising an adhesive layer.

19. A photovoltaic module comprising a frontsheet, a solar cell layer and a backsheet, wherein the frontsheet, the backsheet, or both the frontsheet and the backsheet comprise the transparent multilayer film of claim 17.

20. An article comprising a substrate and a transparent fluoropolymer film, wherein the substrate comprises a material selected from the group consisting of plastics, metals and woods, and the transparent fluoropolymer film comprises:
   a vinyl fluoride polymer;
   2 to 8 wt % of an acrylate polymer; and
   0.1 to 4 wt % of a triazine UV absorber, wherein after heating at 100° C. for 96 hours, the transparent fluoropolymer film has a 340 nm absorbance of at least 1.5.

21. The article of claim 20, wherein plastics comprise a polymeric substrate and a graphic image.

* * * * *